United States Patent [19]

Granzow et al.

[11] 4,359,577

[45] Nov. 16, 1982

[54] NON-PYROPHORIC NIGROSINE BASE

[75] Inventors: Albrecht H. Granzow, Somerset; Erwin Klingsberg, Mountainside, both of N.J.

[73] Assignee: American Cyanamid Company, Stamford, Conn.

[21] Appl. No.: 137,198

[22] Filed: Apr. 4, 1980

[51] Int. Cl.$^3$ ............................................. C09B 57/00
[52] U.S. Cl. ................................................... 544/348
[58] Field of Search ........................................ 544/348

[56] References Cited

U.S. PATENT DOCUMENTS

| | | | |
|---|---|---|---|
| 1,988,499 | 1/1935 | Kimmel | 544/348 |
| 2,194,423 | 3/1940 | Friese | 544/348 |
| 2,328,759 | 9/1943 | Wahl | 544/348 |
| 4,056,530 | 11/1977 | Maekawa | 544/348 |

OTHER PUBLICATIONS

Color Index, 3rd Ed., (1971), vol. 3, p. 3642, pub. by Society of Dyers & Colorists.

*Primary Examiner*—Paul M. Coughlan, Jr.
*Attorney, Agent, or Firm*—Steven J. Hultquist

[57] ABSTRACT

Nigrosine base (Color Index 50,415:1) which is pyrophoric is made non-pyrophoric by sparging a solution thereof in aniline with air.

5 Claims, No Drawings

NON-PYROPHORIC NIGROSINE BASE

Nigrosine base (CI. Solvent Black 7; Colour Index No. 50,415:1 of Colour Index, The Society of Dyers and Colourists) is an aniline condensed dye product which has been produced for over a hundred years by the condensation of excess aniline with nitrobenzene in the presence of iron (or other transition metals such as sodium molybdate or vanadium oxide) and hydrochloric acid or aniline hydrochloride.

Representative patents disclosing the preparation of nigrosine base include: U.S. Pat. Nos. 1,896,244, 1,988,499, and 4,056,530; and German Pat. Nos. 44,406 and 890,104.

In whatever way the nigrosine base was prepared in the past, there has been a continuing problem of the product being pyrophoric, i.e. it tends to ignite spontaneously during storage or transport.

In accordance with the present invention nigrosine base is produced which is non-pyrophoric.

Non-pyrophoric nigrosine base is made by taking pyrophoric nigrosine base in solution in aniline and treating it at a temperature between about 20° C. to about 150° C., preferably about 50°-60° C., by sparging with a stream of air, or other oxygen containing gas, below the surface for a period of about 4 to 30 hours with rapid agitation. Generally, the amount of air sparged into the solution will be about one part by volume per minute for each six parts by volume of the nigrosine base/aniline solution. The amount may vary depending on the degree of agitation and on the efficiency of the air distribution in the solution. Basically, sufficient air is sparged into the solution to provide a nigrosine base which, after drying and milling into a powder, is non-pyrophoric as determined by the following test.

The degree of pyrophoric activity of nigrosine is measured by means of a flow calorimeter. The apparatus comprises a Dewar vessel (665 ml) fitted with a gas dispersion tube (40 mm diameter, coarse) at the bottom and four thermocouples (iron/constantan, type G, 1/16 in stainless steel sheath) located at different distances from the bottom of the vessel. The vessel is provided with a gas-tight cover and a gas-exit tube. The Dewar vessel is placed in an air bath whose temperature can be controlled to within 0.1° C. The gas flow is measured by a rotameter and the exit gas can be analyzed for nitrogen, oxygen, carbon dioxide, and carbon monoxide by means of a Fisher gas partitioner. The output of the four thermocouples is recorded every two minutes by a Fluke Data Logger interfaced with a PDP-11 computer. The procedure is as follows:

An accelerated test is conducted at 100° C. In a glove box with a nitrogen atmosphere, a 150 gram sample of the nigrosine base being tested is heated to about 120° C. and the hot material is transferred into the Dewar vessel which is then placed into the air bath heated to 100° C. The sample is left under a nitrogen atmosphere at a flow rate of 100 ml/min until temperature equilibrium is attained. The gas flow is then switched to air (100 ml/min) and the temperature of the nigrosine sample is recorded as a function of time. Samples of exit gas are analyzed periodically. Typically, a pyrophorically active sample shows a rate of temperature rise of about 0.2° C./min to about 1.0° C./min in the temperature region from 100° C. to 125° C.; beyond that range, the rate of temperature rise accelerates. Unless the air flow is stopped, auto-ignition occurs at temperatures above about 160° C.

Non-pyrophoric nigrosine base exhibits average rates of temperature rise of 0.05° C./min to less than 0.01° C./min; at higher reaction times, the rate of temperature rise decelerates and no ignition occurs. The rates of temperature rise for the two types of nigrosine are paralleled by the rates of consumption of oxygen and formation of CO and $CO_2$, respectively.

Upon a comparison of the analyses of pyrophoric and non-pyrophoric nigrosine bases, it appears that the principal constituent which is removed by the present invention is Induline 6B which has the formula:

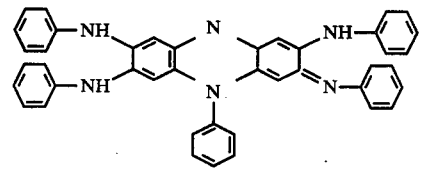

The following examples further illustrate the present invention. All parts and percents are by weight unless otherwise specified.

EXAMPLE 1

200 g of dried pyrophoric nigrosine base is added to 400 g of aniline with stirring. The resultant mixture is sparged with air in a well-agitated reaction vessel at a temperature of 75° C. for about 16 hours.

The aerated solution is then dried to less than 1% volatile matter and the product is cooled to room temperature.

The resultant product is non-pyrophoric.

EXAMPLE 2

Nigrosine base is prepared by reacting aniline and nitrobenzene with hydrochloric acid and ferric chloride solution. After neutralizing and washing, the resultant mixture contained aniline, nigrosine base, nitrobenzene and water.

A portion thereof is spray dried under a nitrogen atmosphere to yield nigrosine base containing 3-5% aniline. The product is then jet milled in an inert atmosphere to provide nigrosine base containing less than 1% volatile matter. It is pyrophoric as determined by the aforementioned test.

A second portion of the washed mixture is, prior to spray drying and jet milling, sparged with air in a well agitated surge tank at 50°-55° C. for a period of 20 hours, using 50 standard cubic feet per minute of air/30-00-3500 gallons of the washed mixture. The aerated solution is the spray dried and jet milled as above. The product is non-pyrophoric as determined by the aforementioned test.

What is claimed is:

1. A method of preparing non-pyrophoric nigrosine base comprising aerating pyrophoric nigrosine base in aniline with an oxygen-containing gas at a temperature of about 20°-150° C. for a period of about 4 to 30 hours with agitation.

2. The method of claim 1 wherein the gas is used at the rate of about one part by volume per minute per six parts by volume of nigrosine base in aniline.

3. The method of claim 1 wherein the temperature is about 50°-60° C.

4. The methods of claims 1, 2 or 3 wherein the oxygen-containing gas is air.

5. The product produced by the process of claims 1, 2 or 4.